(12) United States Patent
Koganezawa et al.

(10) Patent No.: US 7,340,881 B2
(45) Date of Patent: Mar. 11, 2008

(54) GAS TURBINE COMBUSTOR

(75) Inventors: Tomomi Koganezawa, Hitachi (JP); Hiroshi Inoue, Mito (JP); Kazuhiko Kawaike, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 874 days.

(21) Appl. No.: 10/730,088

(22) Filed: Dec. 9, 2003

(65) Prior Publication Data
US 2004/0112039 A1 Jun. 17, 2004

(30) Foreign Application Priority Data
Dec. 12, 2002 (JP) .............................. 2002-360099

(51) Int. Cl.
*F02C 7/00* (2006.01)
*F02C 3/14* (2006.01)
(52) U.S. Cl. ...................... 60/39.511; 60/805
(58) Field of Classification Search ............... 60/39.37, 60/39.511, 805
See application file for complete search history.

(56) References Cited

U.S. PATENT DOCUMENTS

| 3,656,298 | A | * | 4/1972 | Wade | 60/750 |
| 4,719,748 | A | | 1/1988 | Davis, Jr. et al. | |
| 4,903,477 | A | * | 2/1990 | Butt | 60/39.37 |
| 5,309,710 | A | * | 5/1994 | Corr, II | 60/39.23 |
| 5,353,586 | A | | 10/1994 | Taylor et al. | |
| 5,802,841 | A | * | 9/1998 | Maeda | 60/784 |
| 2001/0020364 | A1 | | 9/2001 | Sato et al. | |

FOREIGN PATENT DOCUMENTS

| EP | 0239020 | 3/1987 |
| EP | 1375822 | 6/2003 |
| JP | 61217628 | 3/1985 |
| JP | 62111132 | 8/1985 |
| JP | 62-131927 | 6/1987 |
| JP | 06-173711 | 6/1994 |
| JP | 9-329335 | 12/1997 |
| JP | 2001/107748 | 7/1999 |
| JP | 2001-090949 | 4/2001 |
| JP | 2001-107748 | 4/2001 |
| JP | 2002-317649 | 10/2002 |
| WO | 98/48159 | 10/1998 |

* cited by examiner

*Primary Examiner*—Charles G Freay
(74) *Attorney, Agent, or Firm*—Mattingly, Stanger, Malur & Brundidge, P.C.

(57) ABSTRACT

The invention provides a gas turbine combustor in which the size of a combustor outer casing can be reduced. A transition inner duct and a transition outer duct are disposed in a main housing, inlet openings for a fluid to cool the transition inner duct are formed at ends of the transition outer duct on both sides nearer to the combustor liner and the turbine, and the transition outer duct is formed as an extraction flow passage for extracting the cooling fluid having flown in through the inlet openings to a recuperator. A partition member is also provided to prevent the fluid in the main housing and the fluid in the combustor outer casing from mixing with each other.

10 Claims, 7 Drawing Sheets

FIG.6
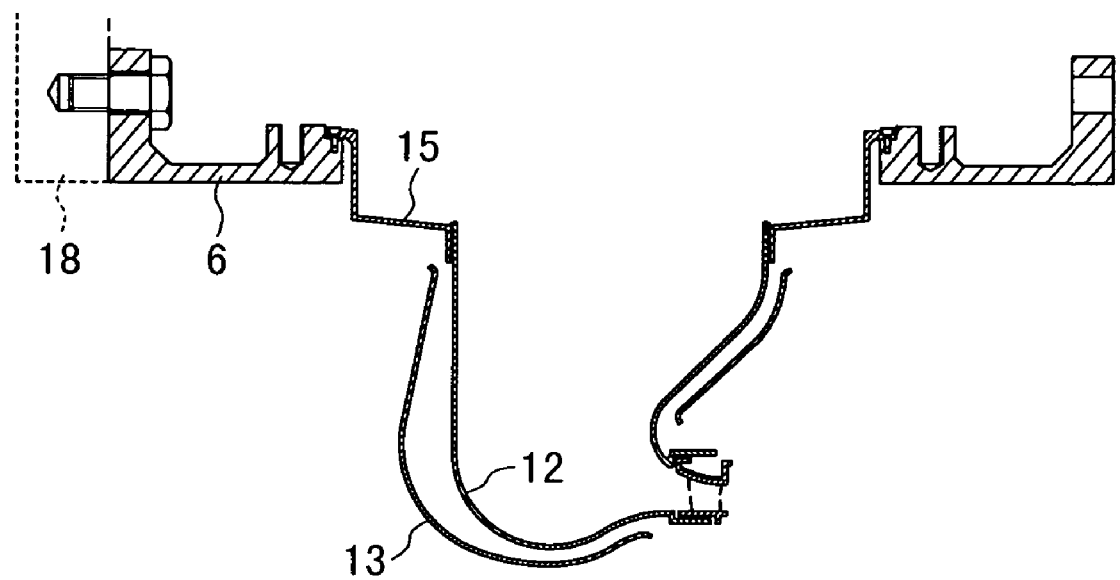
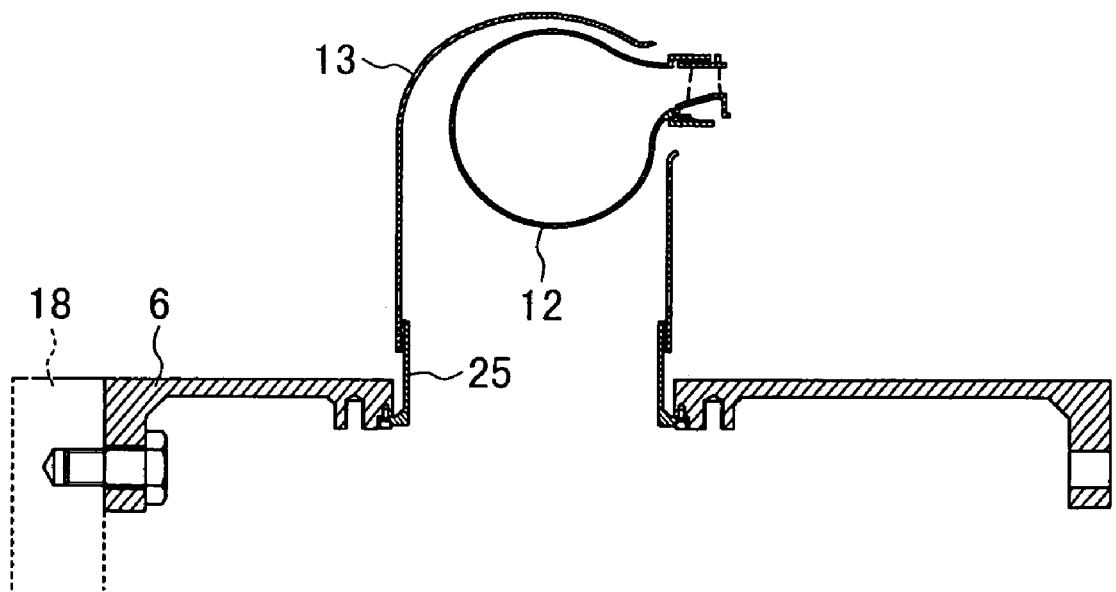

GAS TURBINE COMBUSTOR

BACKGROUND OF THE INVENTION

1. Field of the Invention

The present invention relates to a gas turbine combustor.

2. Description of the Related Art

In known related art regarding recuperated gas turbines, as disclosed in, e.g., JP,A 9-329335 and JP,A 2001-107748, a fluid compressed by a compressor is extracted, and the extracted fluid is heated in a recuperator through heat exchange with gas-turbine exhaust gas and then injected into a combustor, whereby the amount of fuel charged into the combustor is reduced and thermal efficiency is increased.

For the purpose of coping with the combustor outlet temperature heated up to high temperatures, the above-cited JP,A 9-329335 and JP,A 2001-107748 disclose techniques in which a transition duct alone or both the transition duct and a combustor liner are cooled by a relatively low-temperature fluid before recuperation, the fluid is extracted from a combustor outer casing and then passed to the recuperator, and the extracted fluid is injected again to the combustor outer casing for use in combustion.

In this connection, the above-cited publications disclose means for cooling the combustor transition duct to cope with the combustor outlet temperature heated up to high temperatures, thereby increasing the thermal efficiency. The cooling means functions to cool the transition duct alone or both the transition duct and the combustor liner by the relatively low-temperature fluid before recuperation. Thereafter, the fluid is extracted from the combustor outer casing and passed to the recuperator, following which the extracted fluid is injected again to the combustor outer casing for use in combustion.

SUMMARY OF THE INVENTION

In each of the combustors disclosed in the above-cited JP,A 9-329335 and JP,A 2001-107748, a fluid extraction pipe led to the recuperator and a fluid injection pipe led from the recuperator are both provided on the combustor outer casing. This arrangement requires the combustor outer casing to have a certain length. Hence, there is a fear that respective lengths of the combustor liner and the transition duct are also increased, and a reduction in size of the combustor outer casing is impaired.

Accordingly, it is an object of the present invention to provide a gas turbine combustor in which the size of a combustor outer casing can be reduced.

To achieve the above object, in the gas turbine combustor according to the present invention, a transition inner duct and a transition outer duct are disposed in a main housing, inlet openings for a fluid to cool the transition inner duct are formed at ends of the transition outer duct on both sides nearer to the combustor liner and the turbine, and the transition outer duct is formed as an extraction flow passage for extracting the cooling fluid having flown in through the inlet openings to the outside, e.g., a recuperator.

BRIEF DESCRIPTION OF THE DRAWINGS

FIG. 6 is a schematic view for explaining disassembly and assembly of the partition member and a main housing.

DESCRIPTION OF THE PREFERRED EMBODIMENTS

To reduce the size of the combustor, it is preferable that a fluid extracting structure in which the fluid at relatively low temperatures before recuperation flows is provided in the main housing, and a fluid injecting structure in which the fluid at relatively high temperatures after the recuperation flows is provided on the combustor outer casing for which heat-resistant design is relatively easy.

In this respect, if the fluid before the recuperation is flown into the inside of the transition duct for cooling it, the amount of the fluid passing through the recuperator is reduced, thus resulting in a reduction of the amount of recovered heat and hence a lowering of thermal efficiency. It is therefore required to cool the transition duct by convection cooling and to eliminate the wasted cooling fluid as far as possible. To satisfy that requirement, the following structures are provided, i.e., a structure for cooling the transition duct by convection cooling, a structure for extracting the fluid, which has been used for the cooling, to the recuperator, a partition structure for preventing the fluid in the main housing and the fluid in the combustor outer casing from mixing with each other, a sealing structure for a partition wall.

Figure 1:
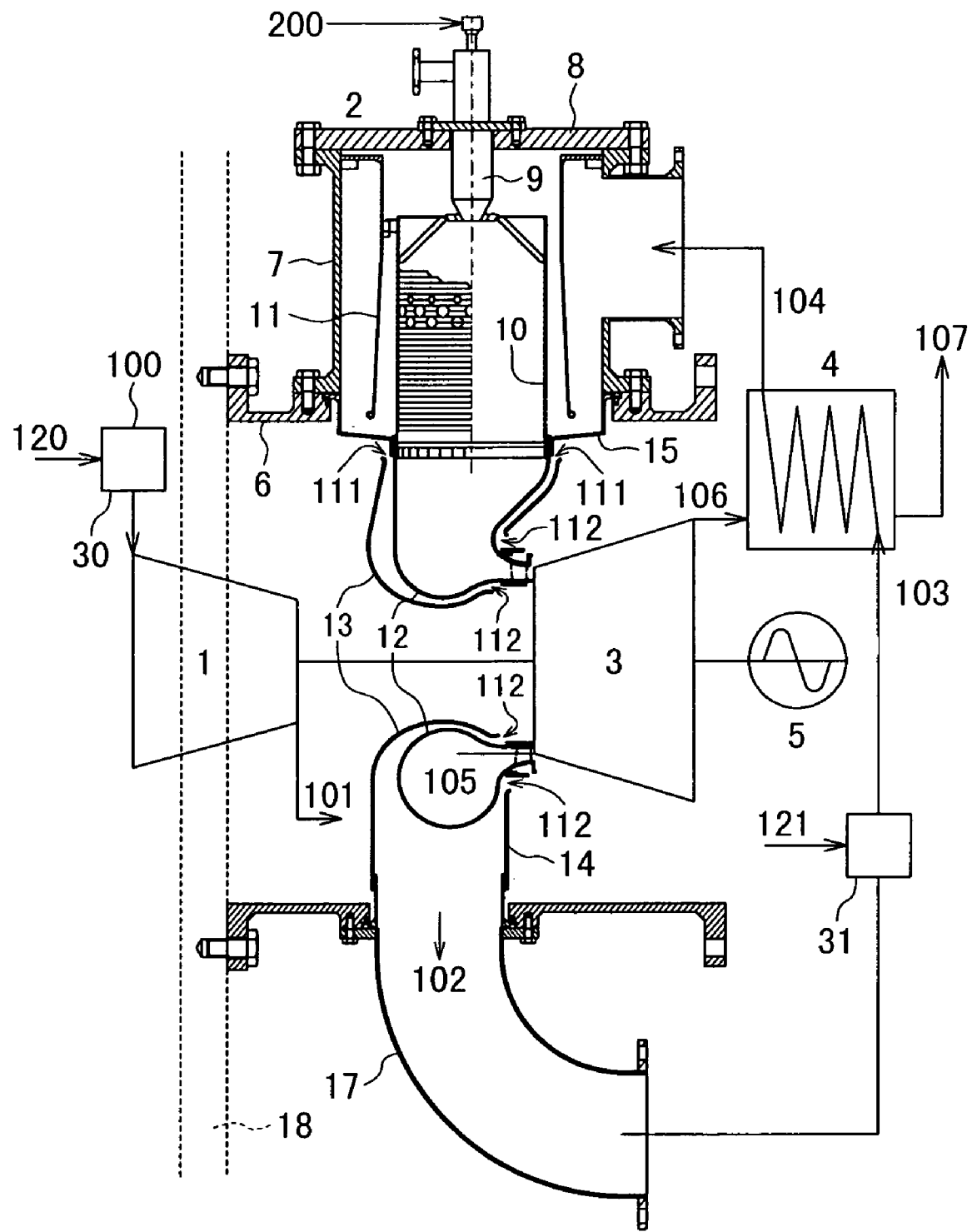
FIG. 1 is a vertical sectional view of a recuperated gas turbine according to one embodiment of the present invention.
Figure 2:
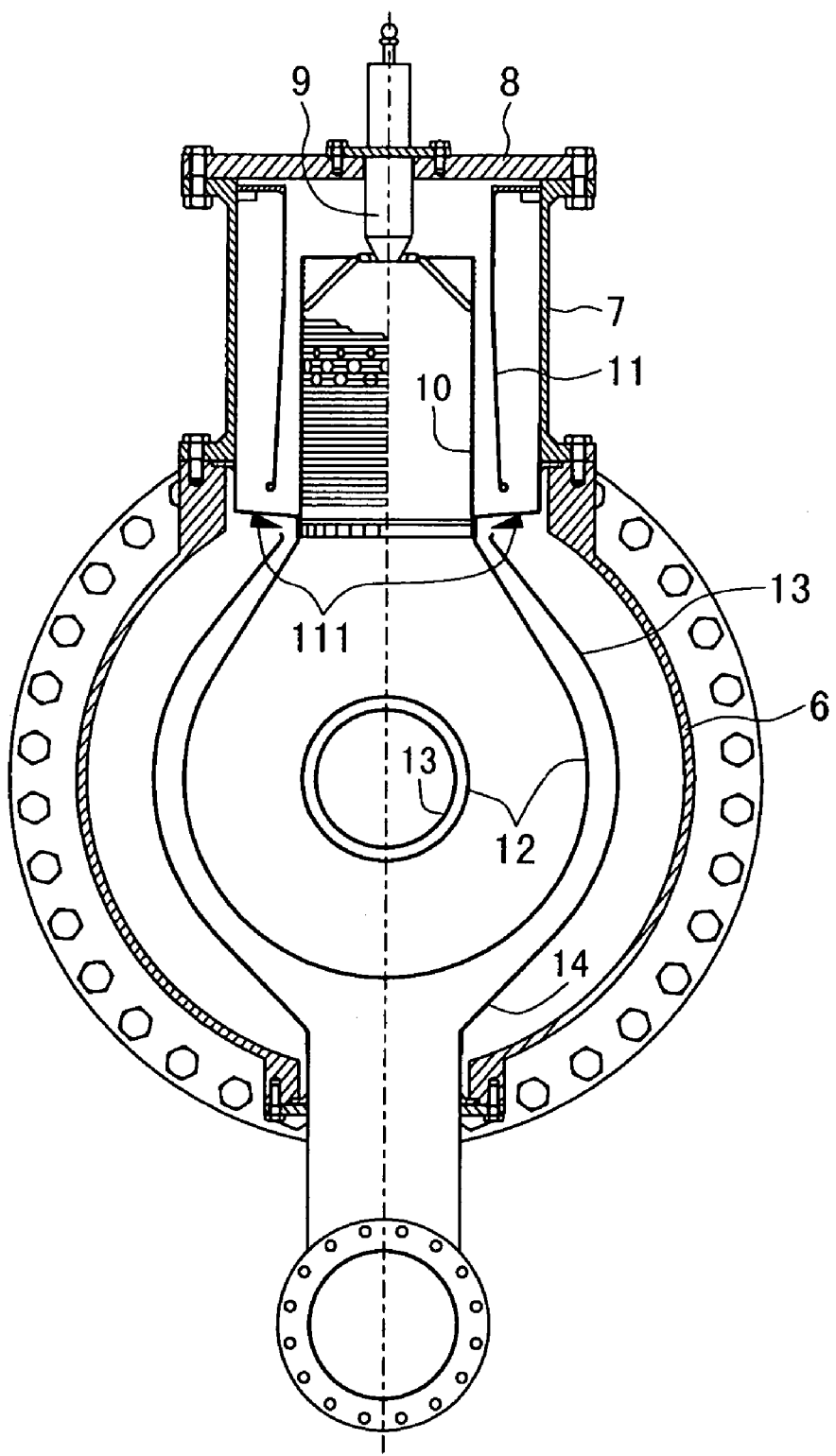
FIG. 2 is a sectional view of the recuperated gas turbine as viewed in the axial direction.

A combustor used in a recuperated gas turbine for heating a fluid delivered from a compressor by thermal energy of gas-turbine exhaust gas will be described below as one embodiment of the present invention with reference to the drawings. FIG. 1 is a vertical sectional view of the recuperated gas turbine, and FIG. 2 is a sectional view of the recuperated gas turbine as viewed in the axial direction.

A recuperated gas turbine for power generation comprises a compressor 1, a combustor 2, a turbine 3, and a recuperator 4. A generator 5 is rotated by an output of the turbine 3 to obtain electric power. The combustor 2 is contained in a main housing 6, a combustor outer casing 7, and a combustor cover 8. A fuel nozzle 9 is disposed at an upstream end of the combustor 2 in its central portion, and a substantially cylindrical combustor liner 10 is disposed downstream of the fuel nozzle 9 to partition air, which is not yet burnt air, and combustion gas, which has already been burnt, from each other. Around the combustor liner 10, an outer peripheral wall (hereinafter referred to as a "flow sleeve 11") is disposed which forms an airflow passage and controls an airflow. The flow sleeve 11 has a larger diameter than the combustor liner 10. The flow sleeve 11 and the combustor liner 10 are in the form of cylinders arranged substantially in concentric relation. A transition inner duct 12 for introducing the combustion gas to the turbine 3 is disposed downstream of the combustor liner 10, and a transition outer duct 13 is disposed around the transition inner duct 12.

Also, the recuperated gas turbine of this embodiment further comprises a water atomizing cooling unit 30 for atomizing water 120 toward air 100 sucked by the gas turbine at an inlet of the compressor 1, and a humidifier 31 for supplying water 121 to air that has been compressed by the compressor 1 and introduced to the recuperator 4. By supplying moisture to air using the water atomizing cooling unit 30 and the humidifier 31, the amount of a working medium for the turbine 3 is increased while lowering the air temperature.

The gas-turbine sucked air 100 (under atmospheric pressure) is compressed by the compressor 1 into high-pressure air 101, which is filled in the main housing 6. Then, the high-pressure air 101 flows into a space defined between the transition inner duct 12 and the transition outer duct 13 to cool an outer wall surface of the transition inner duct 12 by convection cooling. Extracted air 102 having cooled the transition inner duct 12 passes through an extraction flow passage 14 defined by the transition outer duct 13 and is then led to the outside of the main housing 6. Thereafter, the extracted air 102 is supplied as low-temperature air 103 to the recuperator 4 through another extraction flow passage 17 which is connected to the extraction flow passage 14. The air extracted and supplied to the recuperator 4 is heated through heat exchange with gas-turbine exhaust gas 106 (low-pressure combustion gas at a turbine outlet) for conversion into high-temperature air 104 after passing the recuperator 4. The high-temperature air 104 is injected to the combustor outer casing 7. The air injected to the combustor outer casing 7 flows toward the head of the combustor 2 while passing through a substantially annular space defined between the flow sleeve 11 and the combustor liner 10, while the upwardly flowing air is used to cool the combustor liner 10 by convection cooling. A part of the upwardly flowing air flows into the combustor liner 10 through cooling holes formed in the combustor liner 10 to develop film cooling as well. The remaining air flows into the combustor liner 10 through combustion air holes formed in the combustor liner 10 and air holes formed in the fuel nozzle 9, and is used for combustion together with fuel 200 ejected from the fuel nozzle 9. Resulting high-temperature combustion gas 105 is supplied to the turbine 3 through the transition inner duct 12. The low-pressure gas-turbine exhaust gas 106 delivered from the turbine 3 is introduced to the recuperator 4 for heat recovery and then discharged as exhaust gas 107 from an exhaust tower (not shown).

In this embodiment, the combustor 2 is installed as only one unit in an upper portion as viewed on the drawing, and the combustion gas outgoing from the combustor liner 10 has a velocity directing downward at the beginning. However, the combustion gas is caused to spread around a gas turbine axis by the transition inner duct 12, and then flows into the turbine 3 after the gas flow has been changed so as to direct in the axial direction.

With the arrangement described above, an air extracting structure led to the recuperator 4 is constituted by the transition outer duct 13 and the main housing 6, while an air injecting structure led from the recuperator 4 is constituted by the combustor outer casing 7. Thus, the air extracting structure and the air injecting structure can be separated from each other, and therefore the size of the combustor outer casing 7 can be reduced.

Further, in this embodiment, inlets opened to the space defined between the transition outer duct 13 and the transition inner duct 12 are formed in both of a joint portion 111 between the combustor liner 10 and the transition inner duct 12 and a joint portion 112 between the transition inner duct 12 and the turbine 3. With such an arrangement, even when the air extracting structure led to the recuperator 4 is constructed separately from the combustor outer casing 7, a flow of cooling air can be passed through the joint portion 111 between the combustor liner 10 and the transition inner duct 12 without stagnating while effectively cooling the joint portion 111.

Additionally, in this embodiment, the inlets are formed by leaving gaps of appropriate sizes between the transition inner duct 12 and the transition outer duct 13. However, the inlets may also be formed as follows. The size of the gaps is reduced or a sealing structure is provided with omission of the gaps, and holes having required opening areas are formed in the transition outer duct 13.

Figure 3:
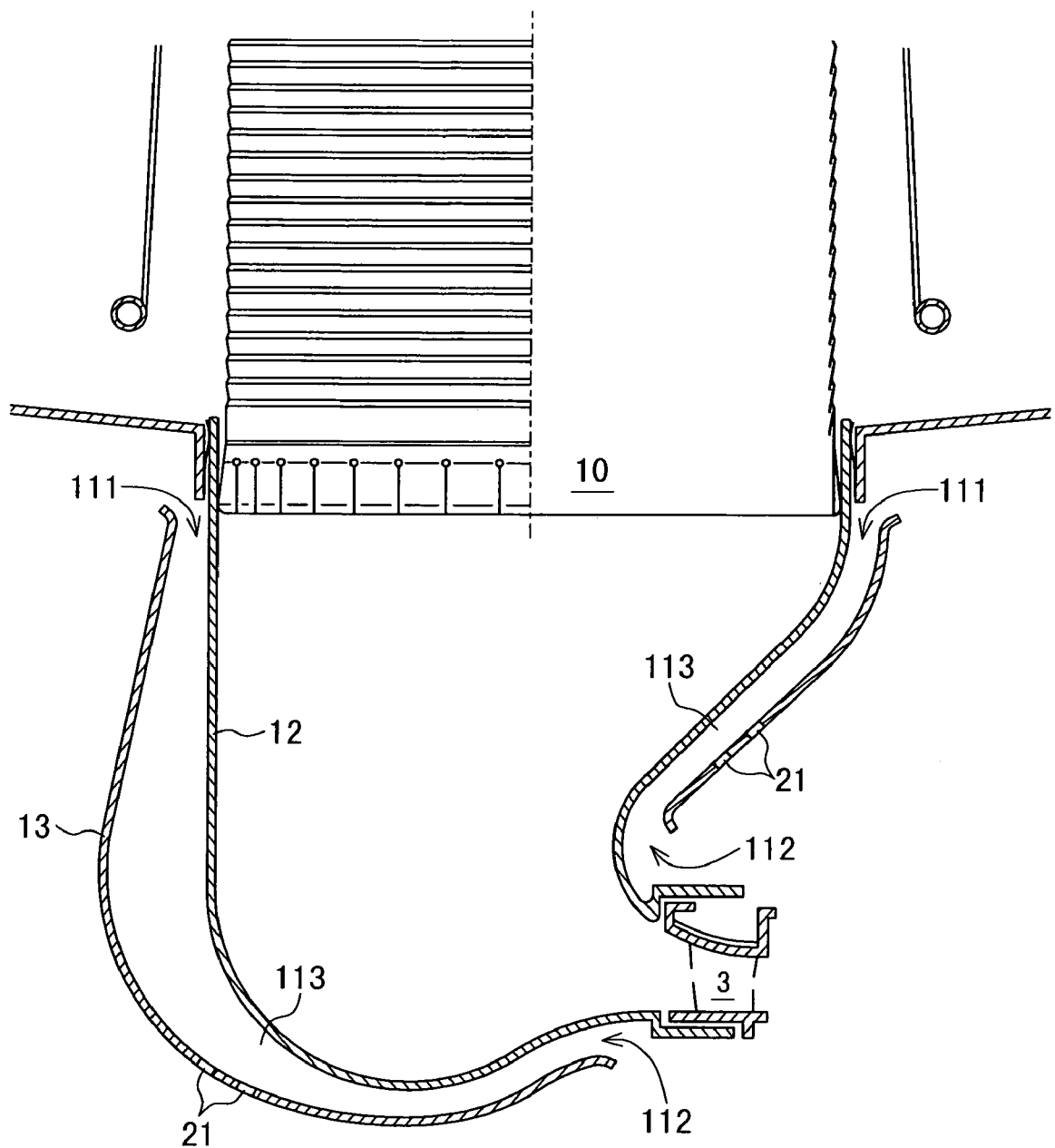
FIG. 3 shows inlet openings formed in a transition outer duct.

A detailed structure of the transition outer duct 13 will be described below with reference to FIG. 3. The high-pressure air flows, as mentioned above, into the space defined between the transition outer duct 13 and the transition inner duct 12 through the inlets formed, as first openings, at both the joint portion 111 (the numeral 111 also indicating an airflow in FIG. 3 by an arrow) between the combustor liner 10 and the transition inner duct 12 and the joint portion 112 (the numeral 112 also indicating an airflow in FIG. 3 by an arrow) between the transition inner duct 12 and the turbine 3. As a result of numerical fluid analysis, it is confirmed that the airflow velocity slows down in areas 113 where the two airflows strike against each other. In this embodiment, therefore, a plurality of opening (holes) 21 are formed, as second openings, in portions of the transition outer duct 13 at positions corresponding to the areas 113 where the two airflows incoming through the first openings strike against each other and stagnate. By causing the air to be sprayed toward an outer surface of the transition inner duct 12 through the second openings 21, the stagnating airflows are stirred and a reduction of the cooling capability is prevented. As an alternative, in addition to the second openings 21, a number of openings may also be formed in other portions of the transition outer duct 13 than those corresponding to the areas 113 so that the transition inner duct 12 is cooled by impingement cooling. This arrangement makes it possible to eliminate stagnation of the cooling airflows and to realize more effective cooling.

Figure 4:
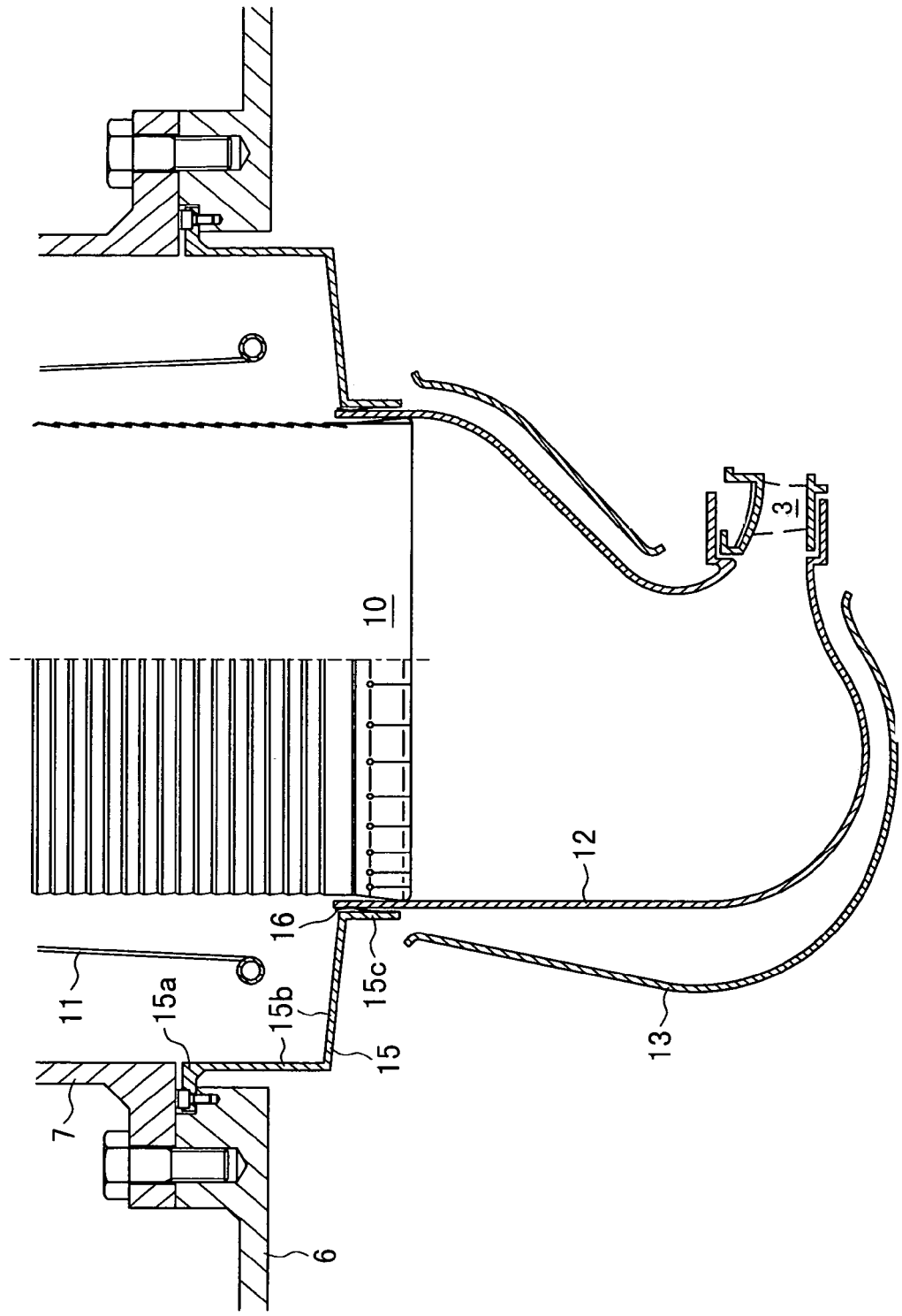
FIG. 4 shows a partition member disposed near a liner.

With reference to FIG. 4, a description is now made of a partition member 15 disposed at the joint portion between the transition inner duct 12 and the combustor liner 10 for partitioning a space in the main housing 6 and a space in the combustor outer casing 7 from each other. The partition member 15 mainly comprises a flange portion 15a, a partition wall portion 15b, and a sealing cylindrical portion 15c. A leaf spring seal 16 is attached to a circumferential surface of the sealing cylindrical portion 15c. The flange portion 15a is used for fixing the partition member 15 to the main housing 6. Specifically, the partition member 15 is fixed in place by inserting bolts through holes formed in the flange portion 15a and then fastening the bolts into screwed holes formed in the main housing 6. The partition wall portion 15b functions to partition the space in the main housing 6 and the space in the combustor outer casing 7 from each other, whereby most of the air filled in the main housing 6 can be supplied to the recuperator 4 for more efficient heat recovery.

In this embodiment, the partition wall portion 15b is substantially in a downwardly recessed shape, as viewed on the drawing, so that the air is sent to a cooling air flow passage defined in the combustor outer casing 7 by the combustor liner 10 and the flow sleeve 11 at a low pressure loss. The sealing cylindrical portion 15c is disposed substantially in concentric relation to the transition inner duct 12 with the leaf spring seal 16 interposed between them in the circumferential direction. In consideration of a thermal elongation difference caused between at the startup and during the steady operation of the gas turbine, a gap between the sealing cylindrical portion 15c and the transition inner duct 12 is set to provide appropriate sealability of the leaf spring seal 16. Further, even when the transition inner duct 12 is thermally elongated upward, as viewed on the drawing, during the operation, satisfactory sealing can be ensured without restricting the thermal elongation of the transition inner duct 12.

Figure 5:
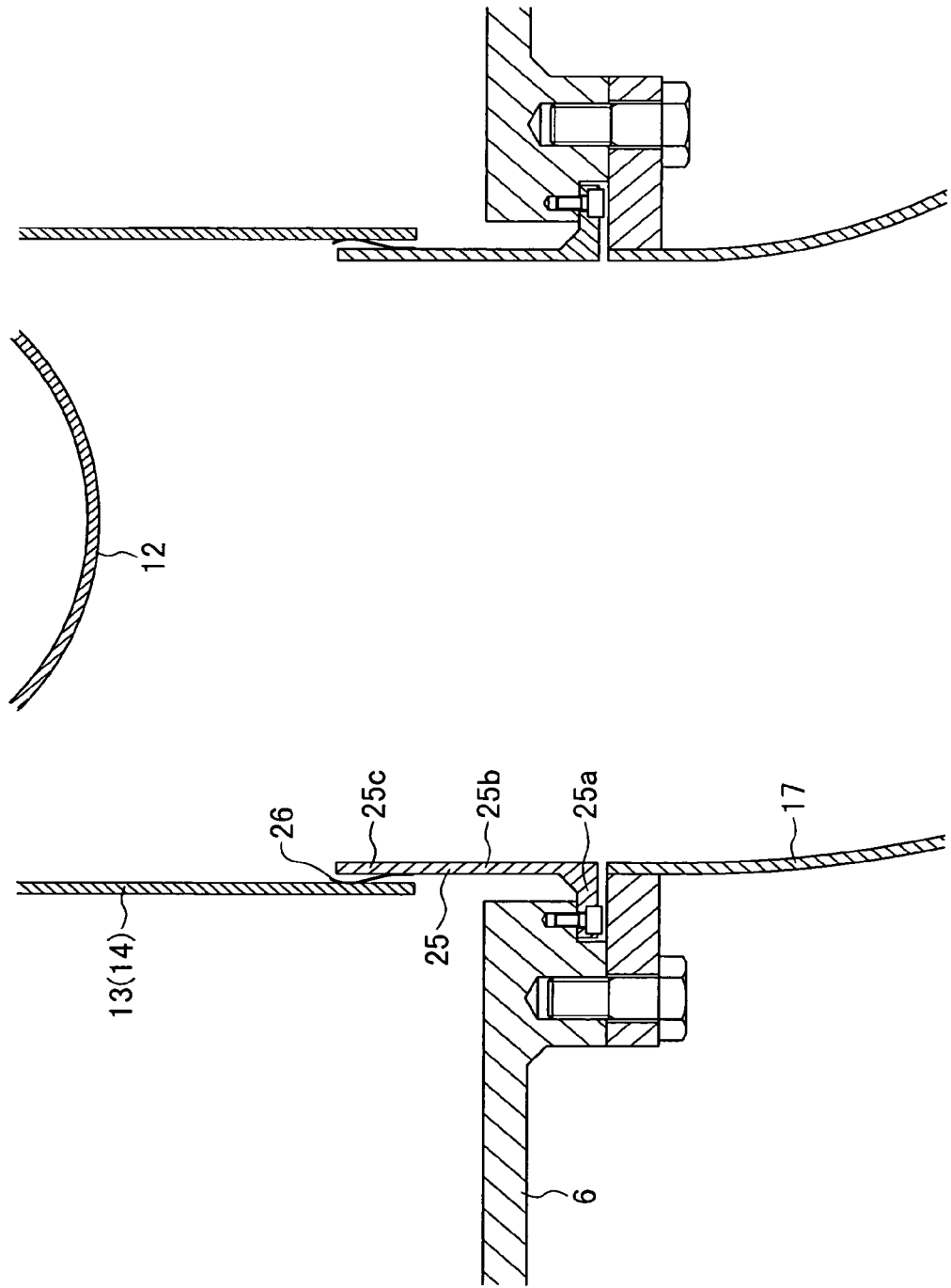
FIG. 5 shows a partition member disposed near an extraction flow passage.

With reference to FIG. 5, a description is now made of a partition member 25 disposed at a joint portion between the extraction flow passage 14 defined by the transition outer duct 13 for supply of the extracted air to the recuperator 4 and the extraction flow passage 17 provided on the main housing 6, thereby partitioning the space in the main housing 6 and a space in the extraction flow passage 17 from each other. The partition member 25 mainly comprises a flange portion 25a, a partition wall portion 25b, and a sealing cylindrical portion 25c. A leaf spring seal 26 is attached to a circumferential surface of the sealing cylindrical portion 25c. The flange portion 25a is used for fixing the partition member 25 to the main housing 6. Specifically, the partition member 25 is fixed in place by inserting bolts through holes formed in the flange portion 25a and then fastening the bolts into screwed holes formed in the main housing 6. The partition wall portion 25b functions to partition the space in the main housing 6 and the space in the extraction flow passage 17 from each other, whereby most of the air filled in the main housing 6 can be supplied to the recuperator 4 for more efficient heat recovery. The sealing cylindrical portion 25c is disposed substantially in concentric relation to the transition outer duct 13 with the leaf spring seal 26 interposed between them in the circumferential direction. In consideration of a thermal elongation difference caused between at the startup and during the steady operation of the gas turbine, a gap between the sealing cylindrical portion 25c and the transition outer duct 13 is set to provide appropriate sealability of the leaf spring seal 26. Further, even when the transition outer duct 13 is thermally elongated downward, as viewed on the drawing, during the operation, satisfactory sealing can be ensured without restricting the thermal elongation of the transition outer duct 13.

A method of disassembling and assembling the partition members 15, 25 will be described below with reference to FIG. 6. FIG. 6 shows a state in which the combustor outer casing 7, the combustor liner 10, the extraction flow passage 17 connected to the recuperator 4, etc. are removed. Those components can be demounted prior to the start of disassembling the partition members 15, 25, and can be mounted after assembling the partition members 15, 25 during assembly. In the disassembling step, the partition members 15, 25 are demounted from the state shown in FIG. 6. Since this embodiment is of a structure that the transition inner duct 12 and the transition outer duct 13 are contained in the main housing 6 and the partition members 15, 25 can be inserted in place externally of the main housing 6, the assembling and disassembling steps can be performed with ease.

In the state in which the partition members 15, 25 are removed, the transition inner duct 12 and the transition outer duct 13 are contained so as to position completely within the main housing 6, and the main housing 6 is attached to a separate suction casing 18. Therefore, the main housing 6 can be freely inserted and withdrawn in the axial direction regardless of the parts disposed inside the main housing 6. Such a structure allowing the main housing 6 to be freely inserted and withdrawn in the axial direction is realized by constructing the partition members 15, 25 separately from both the transition inner duct 12 and the transition outer duct 13.

In assembly, after fixing the parts, including the transition inner duct 12 and the transition outer duct 13, to the suction casing 18, the main housing 6 is inserted in the axial direction and fixed to the suction casing 18. Then, the partition members 15, 25 are inserted in place and fixed to the main housing 6. Since the main housing 6 is not present around at the time of disassembling and assembling the transition inner duct 12 and the transition outer duct 13, tools, etc. are easier to handle and workability can be greatly improved. Further, since the main housing 6 can be inserted and withdrawn in the axial direction, it can be disassembled and assembled with no need of designing the main housing 6 to have a two-part vertically split structure. Thus, since a horizontal flange is no longer required and the main housing can be formed substantially in a cylindrical shape, the structure of the main housing 6 can be highly simplified, hence resulting in a reduction of both weight and cost.

Figure 7:
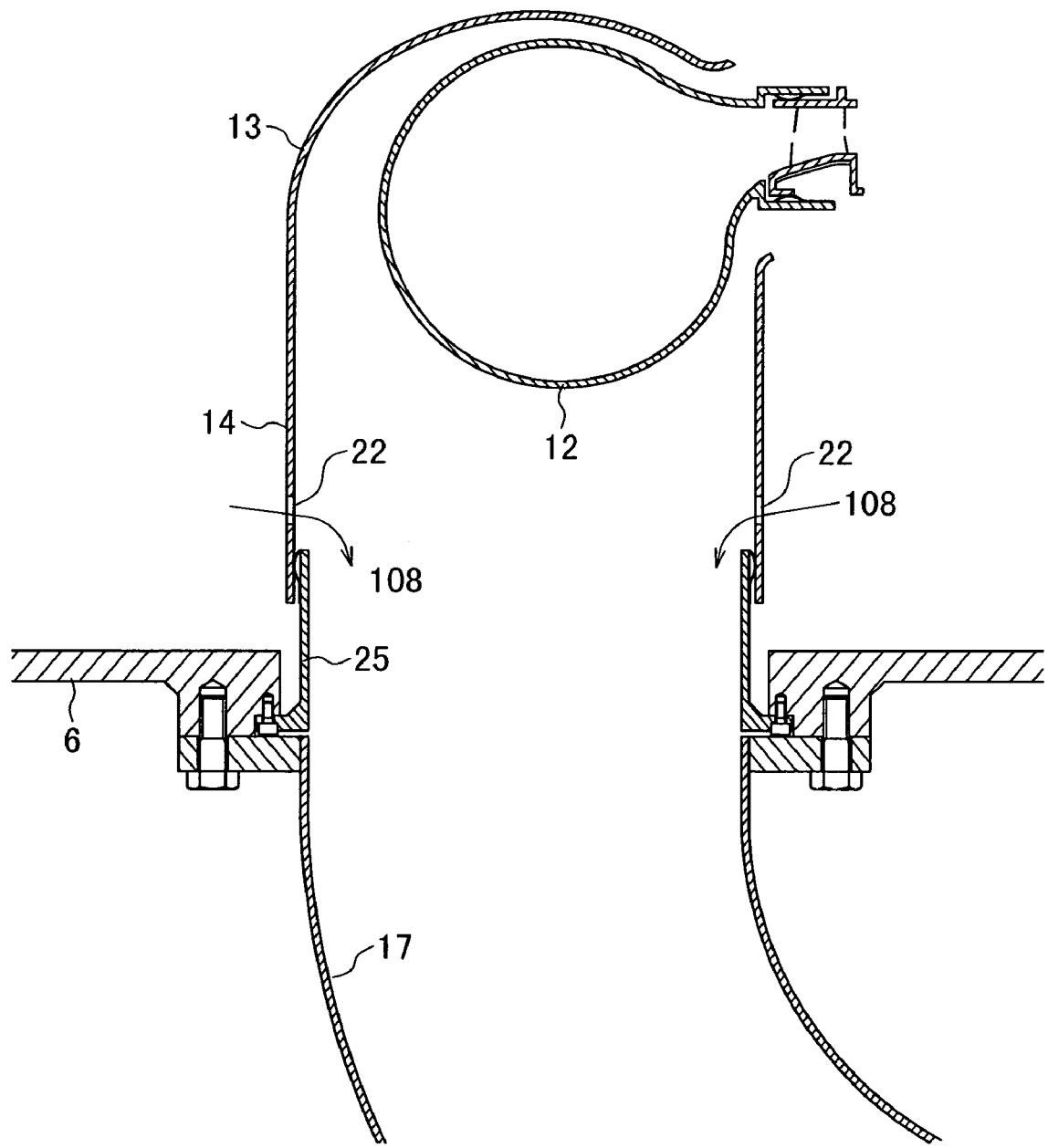
FIG. 7 shows bypass holes formed in the extraction flow passage defined by the transition outer duct.

Bypass holes 22 formed in the transition outer duct 13 will be described below with reference to FIG. 7. As shown in FIG. 7, a plurality of holes are formed, as the bypass holes 22, in the extraction flow passage 14 which is defined by an inner space of the transition outer duct 13 and is led to the recuperator 4. A part of the air delivered from the compressor 1 and filled in the main housing 6 is thereby caused, as indicated by 108, to flow into the extraction flow passage 14 through the bypass holes 22. This bypass air 108 is supplied to the extraction flow passage 17 while bypassing the flow passage defined by the transition inner duct 12 and the transition outer duct 13, and therefore does not contribute to cooling of the transition inner duct 12. If the air delivered from the compressor 1 is caused to flow into the space defined between the transition inner duct 12 and the transition outer duct 13 for cooling the transition inner duct 12, the airflow velocity would be too fast and a pressure loss would be increased. Further, a resulting excessive cooling of the transition inner duct 12 would deprive thermal energy of the combustion gas and reduce the operation efficiency. One solution of lowering the airflow velocity is to increase the diameter of the transition outer duct 13, but this solution impedes a reduction in both size and cost.

Another solution is to provide a branch/joint pipe outside the main housing 6 as disclosed in the above-cited JP,A 2001-107748. However, this solution requires a larger number of parts and increases the cost. Further, the structure is complicated and the number of the disassembling and assembling steps is increased. In contrast, according to this embodiment, it is possible to reduce an unnecessary pressure loss and excessive cooling, which are otherwise caused upon cooling of the transition duct, without complicating the structure, and to improve the thermal efficiency.

Next, a description is made of an embodiment suitable for reducing nitrogen oxides (NOx) exhausted from a gas turbine using the combustor according to the above-described embodiment. In the recuperated gas turbine, a fluid used for combustion is heated to high temperatures and hence the amount of exhausted NOx is necessarily increased. One of combustion methods for reducing the amount of exhausted NOx is to suppress the flame temperature with premixed combustion in which fuel and an oxidant are premixed and then subjected to combustion. In the combustor disclosed in the above-cited JP,A 9-329335, because a high-temperature fluid after recuperation is used for cooling the combustor liner, a larger amount of cooling air is required to hold down the liner temperature to be not higher than a design allowable value, and the amount of air usable for the premixed combustion is reduced correspondingly. Thus, another measure must be added to achieve a reduction of NOx. Also, in the combustor disclosed in the above-cited JP,A 2001-107748, because a low-temperature fluid before recuperation is used for cooling the combustor liner, this combustor is advantageous in lowering the liner temperature and reducing NOx, but the heat recovery rate in the recuperator is reduced corresponding to the amount of the fluid used for cooling the combustor liner, thus resulting in a reduction of efficiency.

To overcome those problems with the related art, in this embodiment, the amount of NOx is reduced by employing the combustor according to the present invention in a humidified and recuperated gas turbine disclosed in PCT Laid-Open Publication WO98/48159. Since combustion air generated in such a gas turbine contains moisture at a concentration not lower than an ordinary level, the flame temperature in a primary zone of the combustor is reduced and generation of NOx can be suppressed. A humidifying and recuperating cycle is a developed version of a recuperating cycle. This means that the problems to be overcome by this embodiment, such as downsizing, promotion of cooling and a reduction of pressure loss, are in common to both the cycles. Accordingly, by applying this embodiment to the humidifying and recuperating cycle, it is possible to not only overcome the problems with the humidifying and recuperating cycle that is a developed version of the recuperating cycle, but also to achieve a reduction of NOx.

Fuel for use in the gas turbine, to which the above-described embodiments are applied, is not limited to the particular type and can be selected from among gaseous fuel, e.g., natural gas and coal gasification gas, and liquid fuel, e.g., kerosene, light oil, heavy oil and alcohols, so long as it is usable in the gas turbine. Also, while the above-described embodiments employ air, by way of example, as a working fluid for the gas turbine, the working fluid may be nitrogen, water vapor, carbon dioxide, or a mixture thereof.

As described above with reference to FIGS. 1 to 7, the combustor according to the embodiment is constructed such that the combustor transition duct of the recuperated gas turbine is cooled by convection cooling with the extracted fluid (air), the air extracting structure led to the recuperator is provided on the main housing, and the air injecting structure led from the recuperator is provided on the combustor outer casing. Thus, since the air extracting structure and the air injecting structure are separated from each other by providing the air extracting structure led to the recuperator 4 on the main housing 6 and the air injecting structure led from the recuperator 4 on the combustor outer casing 7, the size of the combustor outer casing 7 can be reduced and an intermediate transition duct is not required.

Also, in the combustor according to the embodiment, inlets for causing the fluid introduced from the compressor to flow in therethrough as a fluid for cooling the transition inner duct are formed at the ends of the transition outer duct on both sides nearer to the combustor liner and the turbine. In other words, those inlets are formed such that the fluid outgoing from the compressor 1 flows into the space defined between the transition outer duct 13 and the transition inner duct 12 at both the joint portion 111 between the combustor liner 10 and the transition inner duct 12 and the joint portion 112 between the transition inner duct 12 and the turbine 3. Further, the extraction flow passage 14 is defined by the transition outer duct 13 for supply of the fluid having flown in and having cooled the transition inner duct 12 toward the recuperator 4, and it is connected to the extraction flow passage 17 provided on the main housing 6 for supply of the fluid to the recuperator 4. Since the inlets open to the space defined between the transition inner duct 12 and the transition outer duct 13 are formed at both the joint portion 111 between the combustor liner 10 and the transition inner duct 12 and the joint portion 112 between the transition inner duct 12 and the turbine 3, an area where cooling fluid flows stagnate is minimized and effective cooling can be achieved.

Further, one or more openings are formed in a portion of the transition outer duct 13 corresponding to an area where the fluid having flown into the space defined between the transition inner duct 12 and the transition outer duct 13 through the joint portion 111 between the combustor liner 10 and the transition inner duct 12 and the fluid having flown into the same space through the joint portion 112 between the transition inner duct 12 and the turbine 3 strike against each other and stagnate. A flow of the fluid passing through the openings stirs the stagnating flows so as to prevent a lowering of the cooling capability and to cool the transition inner duct 12 evenly. As a result, the area where the cooling fluid flows stagnate is minimized and effective cooling can be achieved. Other advantages are obtained in cutting down the material cost, prolonging the life, and improving the reliability of the transition duct. Similar advantages are also obtained by forming a large number of openings in the transition outer duct 13, instead of forming the openings in only the above-mentioned area, so as to cool the transition inner duct 12 by impingement cooling. This modification can also provide the advantages of cutting down the material cost, prolonging the life, and improving the reliability of the transition duct.

Moreover, in the combustor according to the embodiment, the partition member 15 for partitioning the space in the main housing 6 and the space in the combustor outer casing 7 from each other is disposed at the joint portion between the transition inner duct 12 and the combustor liner 10. Also, the partition member 25 for partitioning the spaces inside and outside the main housing 6 from each other is disposed at the joint portion between the extraction flow passage 14 defined by the inner space of the transition outer duct 13 for supply of the extracted fluid from the compressor 1 toward the recuperator 4 and the extraction flow passage 17 provided on the main housing 6 for supply of the extracted fluid to the recuperator 4. With the provision of the partition members 15 and 25, the fluids before and after the recuperation can be positively partitioned from each other, and an improvement of the thermal efficiency can be reliably achieved with the recuperation. Another advantage is that convection cooling of the transition duct can be effectively realized. The provision of the partition members 15 and 25 also enables satisfactory sealing to be ensured without restricting a thermal elongation during the operation. Furthermore, the efficiency in disassembling and assembling the partition members, the main housing, and the transition outer duct can be increased. In addition, the structure of the main housing can be simplified.

With the structure of the combustor according to the embodiment, the transition inner duct 12 and the transition outer duct 13 are contained within the main housing 6 such that the main housing 6 can be inserted and withdrawn in the axial direction, and the partition members 15, 25 can be inserted and withdrawn externally of the main housing 6. As a result, the structure of the main housing can be simplified, and the efficiency in disassembling and assembling the partition members, the main housing, and the transition outer duct can be increased.

Since the bypass holes 22 for supplying a part of the fluid delivered from the compressor to the recuperator 4 without causing it to take part in cooling of the transition inner duct 12 are formed in the transition outer duct 13, it is possible to construct a bypass structure in the form contained in the main housing 6, and to reduce an undesired pressure loss and excessive cooling, which may occur in cooling of the transition duct, without complicating the structure. An improvement of the thermal efficiency can be hence achieved.

Additionally, by employing the combustor according to the embodiment in the humidifying and recuperating cycle, the amount of NOx (nitrogen oxides) generated from the combustor can be reduced without lowering the efficiency.

Thus, the present invention is capable of providing a gas turbine combustor in which a combustor outer casing has a smaller size.

What is claimed is:

1. A gas turbine combustor comprising a combustor liner contained in a combustor outer casing, which is mounted to a main housing of a turbine, and forming a combustion chamber therein, a transition inner duct for introducing combustion gas generated in said combustor liner, and a transition outer duct disposed around said transition inner duct, wherein:

said transition inner duct and said transition outer duct are disposed in said main housing, inlet openings for causing a fluid introduced from said compressor to flow into a space defined between said transition outer duct and said transition inner duct are formed at both a joint portion between said transition inner duct and said combustor liner and a joint portion between said transition inner duct and said turbine, and said transition outer duct is formed as an extraction flow passage for extracting the fluid having flown in through said inlet openings to the outside of the main housing.

2. A gas turbine combustor according to claim 1, wherein one or more second openings communicating with the space defined between said transition outer duct and said transition inner duct are formed in addition to said inlet openings formed at the respective ends of both the joint portion between said transition inner duct and said combustor liner and the joint portion between said transition inner duct and said turbine.

3. A gas turbine combustor according to claim 2, wherein said second openings are formed as openings to supply a fluid to a space area in which the fluids having flown in through said inlet openings formed in said transition outer duct in positions corresponding to both the joint portion between said transition inner duct and said combustor liner and the joint portion between said transition inner duct and said turbine strike against each other and fluid flows stagnate.

4. A gas turbine combustor according to claim 2, wherein said second openings are formed as a plurality of openings positioned to be able to cool said transition inner duct by impingement cooling.

5. A gas turbine combustor according to claim 1, wherein a first partition member for partitioning a space in said main housing and a space in said combustor outer casing from each other is disposed at the joint portion between said transition inner duct and said combustor liner, a second partition member is disposed at a joint portion between said transition outer duct formed as an extraction flow passage for the fluid having flown in through said inlet openings and a flow passage for supplying the fluid introduced through said extraction flow passage to the outside of said main housing, thereby partitioning the space in said main housing and a space in said flow passage from each other, said transition inner duct and said transition outer duct are contained in said main housing such that said main housing can be inserted and withdrawn in the axial direction, and said first and second partition members can be inserted and withdrawn externally of said main housing.

6. A gas turbine combustor according to claim 1, wherein bypass holes for supplying a part of the fluid delivered from said compressor while bypassing the space defined between said transition outer duct and said transition inner duct are formed in said transition outer duct.

7. A gas turbine combustor comprising a combustor liner contained in a combustor outer casing, which is mounted to a main housing of a turbine, and forming a combustion chamber therein, a transition inner duct for introducing combustion gas generated in said combustor liner, and a transition outer duct for forming a space between said transition inner duct and said transition outer duct, wherein:

said gas turbine combustor is of the type extracting a fluid compressed by said compressor from said main housing supplying, as air for combustion, the fluid having been subjected to heat exchange with gas-turbine exhaust gas in a recuperator, and said transition inner duct and said transition outer duct are disposed in said main housing, inlet openings for causing the fluid introduced from said compressor, as a fluid for cooling said transition inner duct, to flow into a space defined between said transition outer duct and said transition inner duct are formed at ends of said transition outer duct on both sides nearer to said combustor liner and said turbine, and said transition outer duct is formed as an extraction flow passage for extracting the cooling fluid having flown in through said inlet openings to said recuperator.

8. A gas turbine combustor comprising a combustor liner contained in a combustor outer casing, which is mounted to a main housing of a turbine, and forming a combustion chamber therein, a transition inner duct for introducing combustion gas generated in said combustor liner, and a transition outer duct disposed around said transition inner duct, wherein:

said gas turbine combustor is of the type humidifying a fluid at an inlet of said compressor and a fluid extracted from said main housing and supplying, as air for combustion, the high-moisture fluid having been subjected to heat exchange with gas-turbine exhaust gas in a recuperator, and said transition inner duct and said transition outer duct are disposed in said main housing, inlet openings for causing the fluid introduced from said compressor to flow into a space defined between said transition outer duct and said transition inner duct are formed at respective ends of both a joint portion between said transition inner duct and said combustor liner and a joint portion between said transition inner duct and said turbine, and said transition outer duct is formed as an extraction flow passage for extracting the fluid having flown in through said inlet openings to said recuperator.

9. A gas turbine comprising a compressor for compressing a fluid, a combustor for burning the fluid compressed by said compressor and fuel, and a turbine driven by combustion gas generated in said combustor, wherein:

said combustor comprises a combustor liner for forming a combustion chamber therein, a transition inner duct for introducing the combustion gas generated in said combustor liner to said gas turbine, and a transition outer duct disposed around said transition inner duct, said combustor, said transition inner duct, said transition outer duct and said turbine being contained in a main housing of said turbine, said combustor liner being contained in a combustor outer casing mounted to said main housing, and said transition inner duct and said transition outer duct are disposed in said main housing, inlet openings for causing a fluid introduced from said compressor to flow into a space defined between said transition outer duct and said transition inner duct are formed at respective ends of both a joint portion between said transition inner duct and said combustor liner and a joint portion between said transition inner duct and said turbine, and said transition outer duct is formed as an extraction flow passage for extracting the fluid having flown in through said inlet openings to the outside of said main housing.

10. A recuperated gas turbine comprising a compressor for compressing a fluid, a recuperator for performing heat exchange between the fluid compressed by said compressor and gas-turbine exhaust gas, a combustor for burning the fluid having passed through said recuperator and fuel, and a turbine driven by combustion gas generated in said combustor, wherein:

said combustor comprises a combustor liner for forming a combustion chamber therein, a transition inner duct for introducing the combustion gas generated in said combustor liner to said gas turbine, and a transition outer duct disposed around said transition inner duct, said combustor, said transition inner duct, said transition outer duct and said turbine being contained in a main housing of said turbine, said combustor liner being contained in a combustor outer casing mounted to said main housing, and said transition inner duct and said transition outer duct are disposed in said main housing, inlet openings for causing a fluid introduced from said compressor to flow into a space defined between said transition outer duct and said transition inner duct are formed at respective ends of both a joint portion between said transition inner duct and said combustor liner and a joint portion between said transition inner duct and said turbine, and said transition outer duct is formed as an extraction flow passage for extracting the fluid having flown in through said inlet openings to said recuperator.

* * * * *